April 23, 1963   A. NOYES, JR   3,087,152
RADAR BEACON RECEIVER FOR POSITION-MODULATED PULSE SIGNALS
Filed July 1, 1948   5 Sheets-Sheet 1
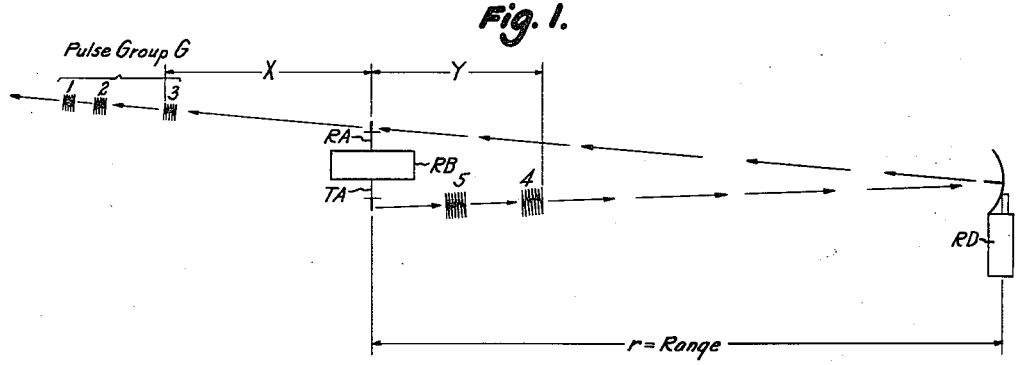
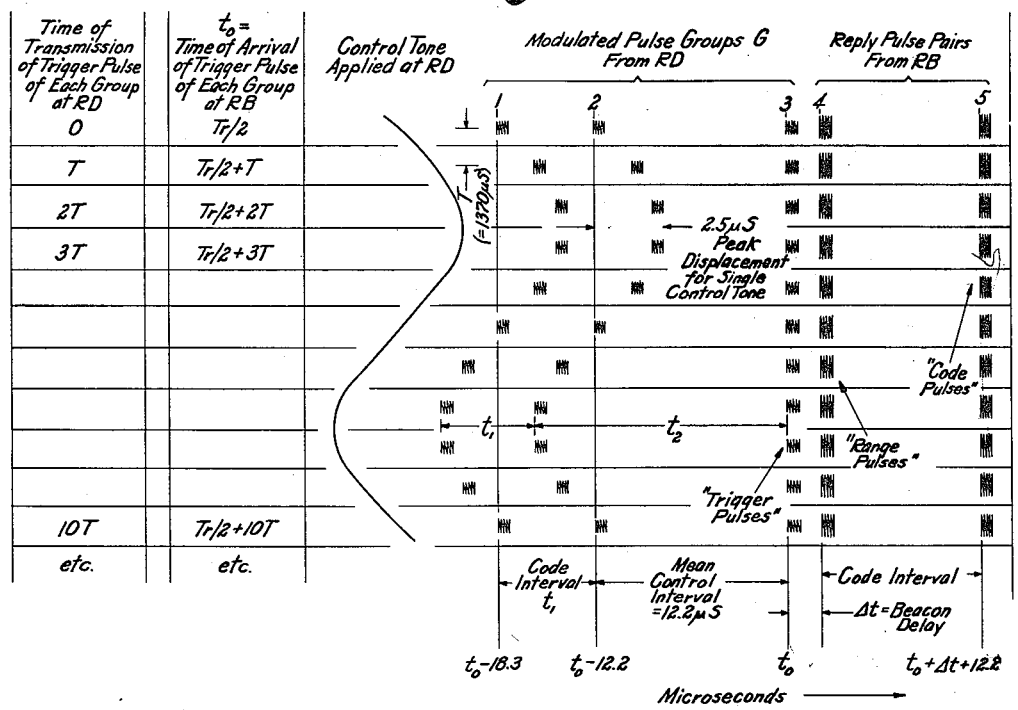

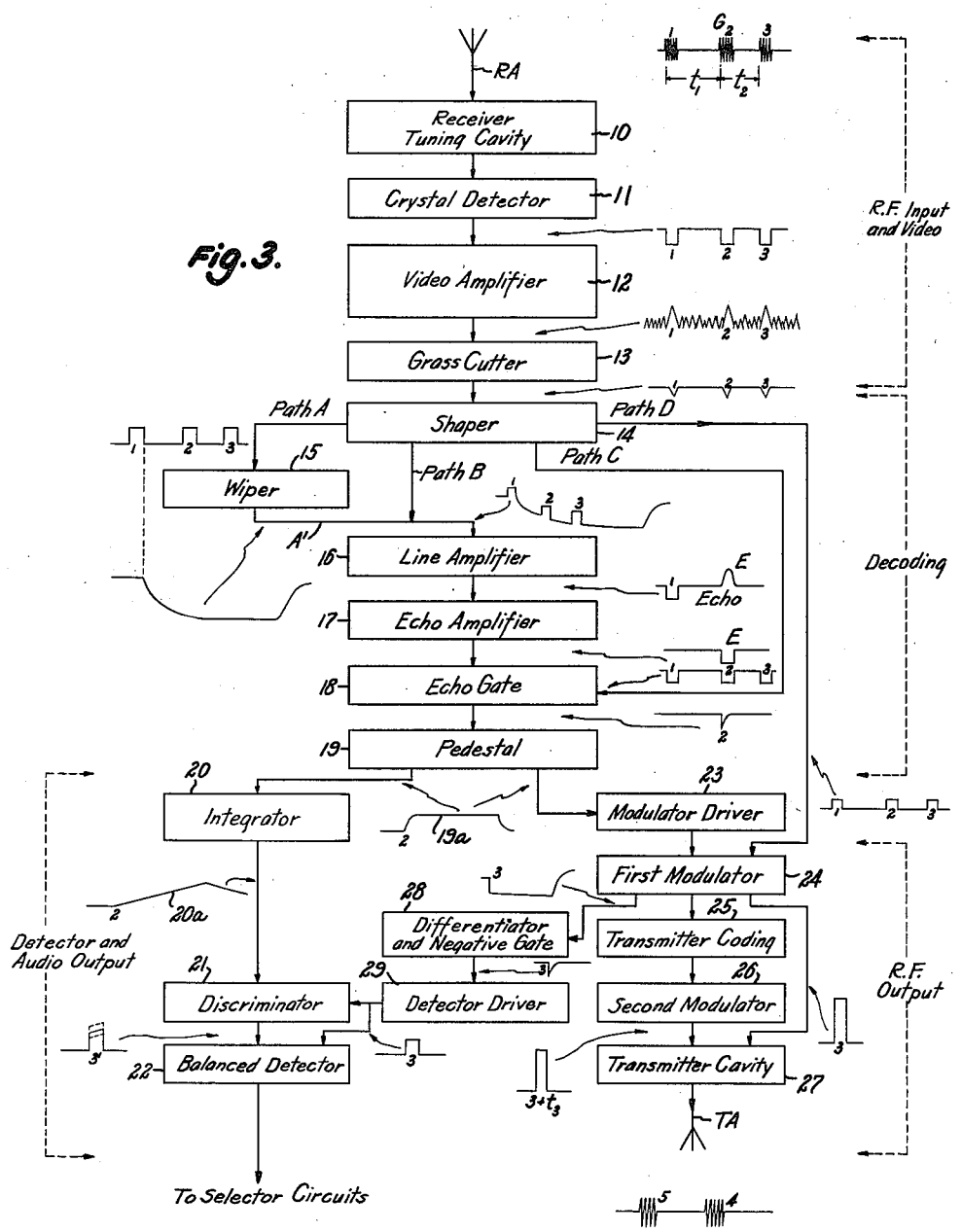

Fig. 4A. Tube 30 Grid

Fig. 4B. Tube 30 Plate

Fig. 4C. Tube 36A Grid

Fig. 4D. Tube 36A Plate

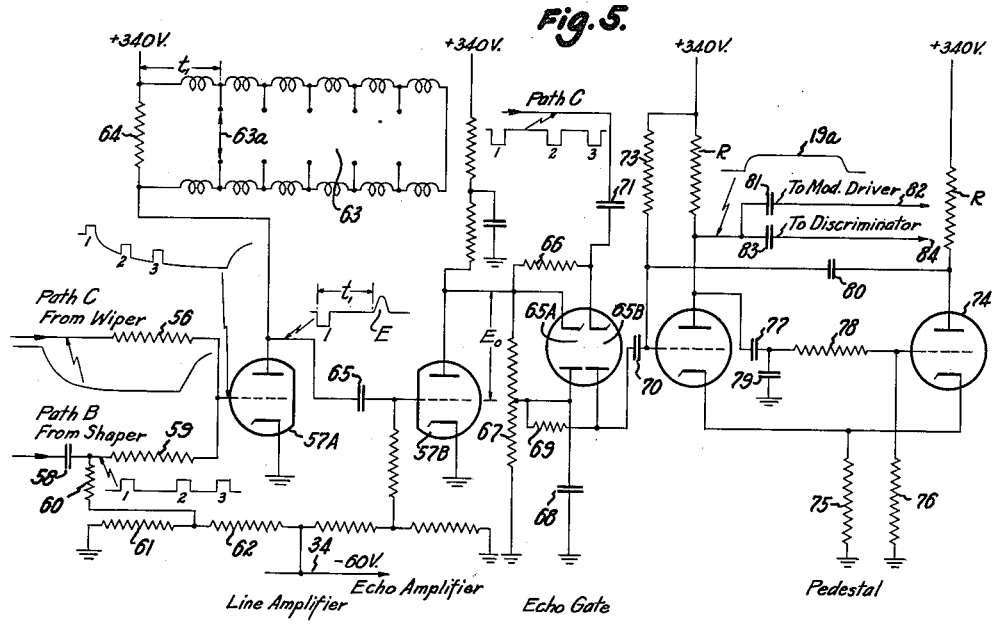
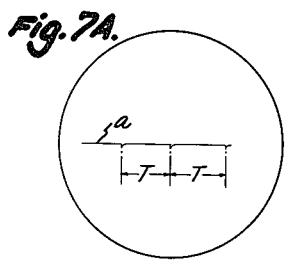
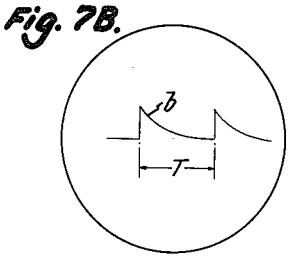
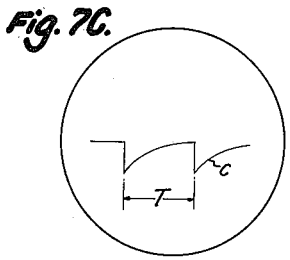
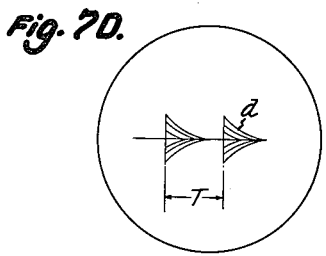
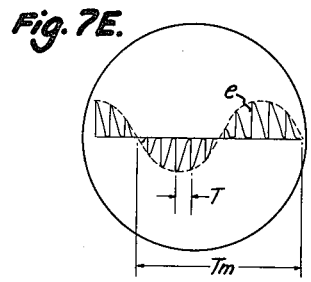

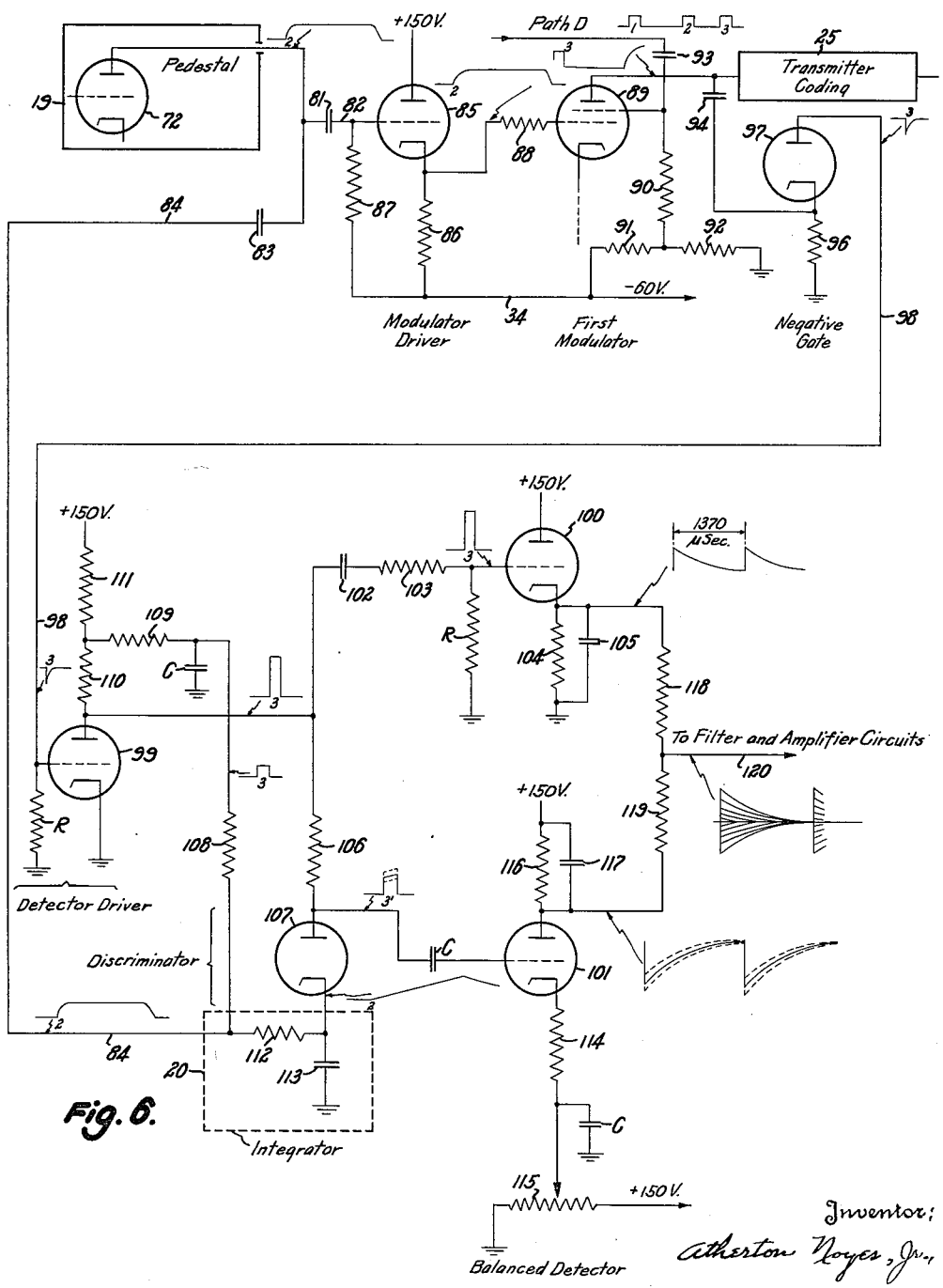

United States Patent Office

3,087,152
Patented Apr. 23, 1963

3,087,152
RADAR BEACON RECEIVER FOR POSITION-MODULATED PULSE SIGNALS
Atherton Noyes, Jr., Mountain Lakes, N.J., assignor to Aircraft Radio Corporation, Boonton, N.J., a corporation of New Jersey
Filed July 1, 1948, Ser. No. 36,494
16 Claims. (Cl. 343—6.8)

This invention relates to radar beacon receivers for the energization of a transmitter and/or of one or more control circuits in accordance with the relative position or timing of the signal pulses within cyclically repeated groups of a plurality of pulses. More particularly, the invention relates to novel circuit arrangements for rendering the operation of such receivers substantially independent of undesired fluctuations in the duration or amplitude of the received pulses, and for precluding false operation in response to noise and/or jamming signals.

Objects of the invention are to improve the sensitivity and reliability of radar beacons for the reception of cyclically repeated groups of radar signal pulses, the position or timing of the pulses within each group being variable in accordance with selected codes and, if desired, in accordance with an imposed modulation. Other objects are to provide balanced detector circuits for developing voltage or current waves significant of the modulation imposed upon position-coded radio frequency pulses transmitted from a radar installation.

These and other objects and the advantages of the invention will be apparent from the following specification when taken with the accompanying drawings in which:

FIG. 1 is a schematic diagram of a radar installation for transmitting and a radar beacon for receiving cyclically repeated pulses of radio frequency energy; the instantaneous space positions of one group of transmitted radar pulses and of a resultant group of reply pulses being shown;

FIG. 2 is a tabulation or graphic illustration on a time basis of the general type of position-coded and position-modulated groups of pulses of radio frequency energy from which the radar beacon receiver of this invention develops control voltages or currents significant of the modulation imposed upon signal pulses of the position-coded groups which the beacon receiver is adjusted to receive;

FIG. 3 is a block diagram of the several components of a radar beacon including circuits embodying the invention;

FIGS. 4A to 4D are typical curves showing wave forms developed by weak and strong signal pulses respectively;

FIGS. 5 and 6 are circuit diagrams of the decoding and the detector circuits respectively; and FIGS. 7A to 7E are schematic views of detector output patterns as seen on an oscilloscope screen.

Figure 4:
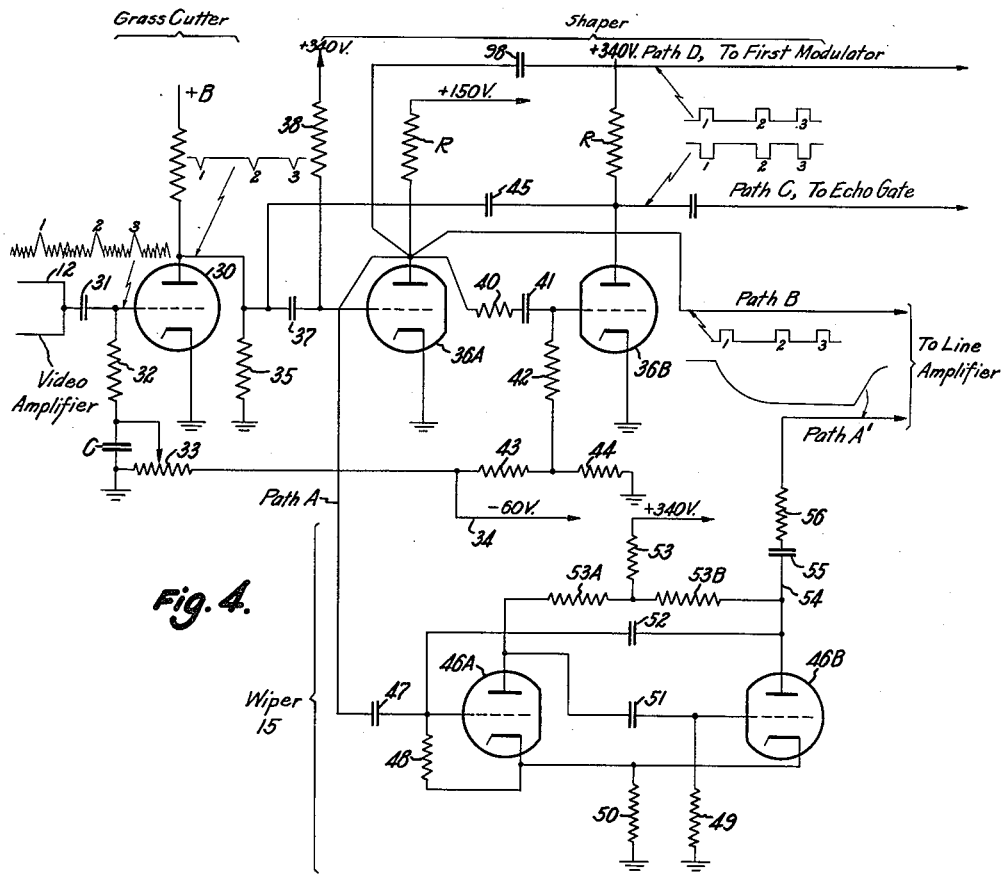
FIG. 4 is a circuit diagram of the shaper and wiper components.

The significance of features of the invention which contribute to stability of operation can be best appreciated by first considering the general method of operation of a mobile radar beacon and the type of pulse-position modulated radar signals from which a radar beacon embodying the invention develops voltages for the selective control of relays which, in turn, may control various signal or operational devices on an aircraft of manually or remotely controlled type, on a guided missile or rocket, or on a vessel or a torpedo. As shown schematically in FIG. 1, a radar installation RD transmits a beam of interrogation or control pulse groups G of radio frequency energy to a radar beacon RB which is installed on an aircraft, rocket or the like, and the general purpose of a radar beacon is to supply a reply pulse, or a group R of reply pulses, in answer to each received pulse group G. As originally developed and operated, a radar installation transmitted single pulses and a radar beacon was triggered by a received pulse to transmit a single pulse for purpose of indentification and also as an indication of the range $r$ of the aircraft from the radar installation.

In place of a single interrogation pulse, the radar installation RD with which a radar beacon RB embodying the invention is to be employed transmits groups G of three pulses 1, 2 and 3 respectively, which are spaced according to preselected codes and modulations, and the radar beacon transmits a group R of two pulses 4 and 5 in reply to each group of received pulses. The instantaneous space positions of the radio frequeny pulses are shown in FIG. 1 as of a time when a group G has passed an arbitrary distance X beyond the beacon receiver antenna RA and, in passing, has triggered the radar beacon to transmit a reply group R of pulses from the transmitter antenna TA. The reply pulse group R is spaced from the radar beacon RB by a distance Y which is somewhat less than distance X in view of the small time delay $\Delta t$ of the radar beacon. The first reply pulse 4 is a "range" pulse which, in known manner, affords an indication of the range $r$ of the radar beacon RB from the radar installation RD, and the second reply pulse 5 is spaced from pulse 4 by a time interval significant, according to a preselected coding, of the identity of the aircraft or missile on which the radar beacon RB is installed, or significant of any other data which it may be required to telemeter.

As shown graphically in the time tabulation, FIG. 2, pulse 3 of each group G is the "trigger" pulse which is fixed as to time and is periodically repeated at the pulse repetition PRF, and pulses 1 and 2 are spaced from each other by a time interval $t_1$ which is constant for any given transmission or control operation but which is adjustable in accordance to a preselected code; the radar beacon of course including elements adjustable to adapt the radar beacon to respond only to the selected code timing interval $t_1$. The position of pulses 1, 2 with respect to the trigger pulse 3 may be varied according to a control tone or modulation M applied at the radar installation RD, the instantaneous time interval $t_2$ between pulses 2 and 3 thus varying about a mean control interval in accordance with the applied control modulation.

The invention is not limited to any particular carrier or modulation frequencies, or to particular coding intervals or pulse repetition frequencies but, for convenience of description and to facilitate an understanding of the invention, typical appropriate values characteristic of one practical embodiment of the invention will be specified herein.

The radar installation was of the "SCR-584" type developing a carrier frequency in the band of approximately 3000 megacycles per second, the pulse repetition frequency PRF was 731 cycles per second and the period T between transmission of groups G of signal pulses therefore was 1370 microseconds. The code interval $t_1$ between pulses 1 and 2 was adjustable in steps from zero, i.e. pulse 1 suppressed, to about 22 microseconds, and the mean control interval between pulses 2 and 3 was 12.2 microseconds. The peak modulation displacement of pulse 2 with respect to pulse 3 was ±2.5 microseconds for a single control or modulation tone M, but means was provided at the radar transmitter RD and at the radar beacon RB for the simultaneous transmission and detection, respectively, of two control tones. The control or modulation tones were of low frequency, i.e. between about 73 and 244 cycles per second in six steps and afforded, singly and in groups of two, a selective control of 14 relay circuits at the radar beacon.

It is perhaps helpful, in visualizing the duty cycles and relative time intervals involved in this system, to magnify the time scale by a factor of sixty million, so that one microsecond, which has no real meaning in terms of human experience, becomes one minute. On this magnified time scale, each 0.7 microsecond pulse becomes a radio frequency transmission of about 40 seconds' duration, and the quiet intervals between pulses of one pulse-group are about six minutes long for the 6 microsecond minimum code spacing and twelve minutes for the mean control interval. Moreover, the interval T between pulse groups becomes about 24 hours, so that the RD transmission can be visualized as a group of three brief C.W. transmissions occurring once a day, with radio silence all the rest of the time. On this time scale, modulation would consist of varying the time interval between the second and third transmissions by varying together the scheduled transmission times of the first and second pulses by amounts up to ±2½ minutes from the average, so that the scheduled time of transmission of the first pulse (say) would vary cyclically from day to day between 8:27½ a.m. and 8:32½ a.m. in accordance with the modulation. The second transmission would occur uniformly six minutes after the first, and the third pulse transmission would take place regularly at 8:48 a.m. The transmitter would then shut down until the next day.

It is a fact that with the circuits of the present invention reliable control operations may be had in spite of the exceedingly small fraction of the time during which the circuits of the radar beacon are energized by received signals. The present invention relates primarily to novel circuit arrangements useful as decoding and demodulating components of such a radar beacon. The several components of a radar beacon embodying the invention are shown in block diagram in FIG. 3, and many of the components are of known design and will not be described in detail. The method of operation of the radar beacon will first be described in terms of the functions of the several components, and the novel circuit arrangements will then be described in detail.

The pulse or wave forms at different stages of the apparatus are shown in lateral alinement with corresponding portions of the block diagram, and the reference numerals 1, 2 and 3 identify not only the successive pulses of an arriving group G but also the corresponding voltage pulses which are developed from the respective radar pulses of a group G at different stages of the radar beacon, the starting times of the waveforms developed within the apparatus being substantially identical with the arrival times of the received pulses 1, 2 and 3 respectively.

The radar pulse group from the receiving antenna RA passes through the radio frequency tuning cavity 10, is rectified by a crystal detector 11 and emerges as three negative trigger pulses which are amplified in a multistage video amplifier 12 to emerge as positive pulses for application to a noise clipper or "grass cutter" 13. This component includes a tube biased sufficiently below cut-off so that random noise does not produce plate circuit disturbance. The output from the grass-cutter 13 consists of three negative voltage peaks each of which trigger a "shaper" 14 which, as will be described in detail hereinafter, is a one-shot multivibrator producing in its output circuits approximately square pulses 1, 2 and 3 which are largely independent, in shape, of the trigger pulses but which correspond precisely in time with the incoming radar pulses, and these shaper-produced pulses are used in place of the incoming signals throughout the remainder of the apparatus. The sequence of square pulses developed by the shaper 14 are all transmitted along each of four paths A to D respectively; the path A leading to a one-shot multivibrator, shown schematically as a "wiper" 15, which is triggered by the trailing edge of square pulse 1 and which, by path A', immediately carries the input grid of a line amplifier tube 16 so far negative that only pulse 1 of the group which reaches the line amplifier along path B is effective to develop a negative plate voltage pulse. The plate circuit of the line amplifier includes a delay-line of manually adjustable electrical length for developing a positive echo pulse E which is spaced, in time, from the negative pulse 1 by the selected code interval $t_1$. The echo pulse is amplified in an echo amplifier 17 and passed, now as a negative pulse E, to an echo gate 18 upon which a sequence of negative square pulses 1, 2 and 3 from the shaper 14 is also impressed along path C. The echo gate 18 comprises a diode assembly so biased that neither the echo pulse E nor the individual square pulses can independently pass through the echo gate but, if pulse 2 arrives at the time the echo gate is momentarily sensitized by the echo pulse E, the pulse 2 then passes through to emerge as a negative trigger pulse 2 which is applied to a "pedestal" 19, or one-shot multivibrator as will be described later, which develops a relatively long output wave 19a starting at the time of the second signal pulse and extending, for example for about 10 microseconds, beyond the normal time of arrival of pulse 3.

This relatively long voltage pulse is passed to an integrator 20 which comprises a resistance-condenser combination for developing a sloping wave form 20a which is impressed upon a "discriminator" 21 working into a balanced detector 22; and the relatively long voltage pulse 2 is also passed to a modulator driver 23 working into the first modulator 24 of the transmitter portion of the radar beacon. A sequence of positive square pulses 1, 2 and 3 from the shaper 14 is also impressed upon the first modulator 24 along path D; and the function of the first modulator 24 is to develop a square wave or voltage pulse 3 at the time of arrival of radar pulse 3, when, and only when, the pedestal 19 has been previously energized by the timely arrival of pulse 2 at the selected code time interval $t_1$ following pulse 1 and when, further, pulse 3 arrives during the time the pedestal remains energized.

The additional components of the reply or transmitter system, which forms no part of the present invention, include a transmitting coding unit 25 working out of the first modulator 24 and into a second modulator 26. A transmitter cavity 27 receives a voltage pulse 3 from the first modulator 24 and a second voltage pulse, identified in FIG. 3 as "$3+t_3$," from the second modulator 26. The time interval $t_3$ between the pulse inputs to the cavity 27 is determined by the adjustment of coding circuits associated with the second modulator 26, and the time-spaced input pulses thus develop the group R of reply pulses 4 and 5 which are transmitted from the antenna TA.

So far as concerns the detector circuits of this invention, the function of the first modulator 24 is to develop a short negative signal at time 3 for application to the detector driver 29, for the purpose of generating therein a short positive pulse 3 to be passed to the balanced detector 22 directly and also by way of discriminator 21. The voltage pulse 3 imposed directly upon the balanced detector 22 by the detector driver 29 is of substantially constant amplitude, but the voltage pulse 3' which reaches the balanced detector 22 from the discriminator 21 varies in amplitude according to the modulation, or pulse-position in a transmitted group G, of the pulses 1 and 2 with respect to the pulse 3. The voltage output from the balanced detector 22 is therefore significant of the pulse-position modulation of the radar pulses. The circuits of the detector include appropriate filters, of low pass, band pass or sharply tuned characteristics according to the results desired. In the particular example herein described, six sharply tuned selector circuits were employed, but such circuits are not shown since they form no part of the present invention.

It is known that radar beacons of this general type may fail to function properly when the pulse signals at the radar beacon vary materially as to amplitude or duration, and/or when one pulse of a group is strongly attenuated or missing. Such effects are always present when the beacon approaches the limit of range of the radar transmitter, or when aircraft attitude changes partially shield the receiving antenna. Improved stability in operation is attained with the novel decoding and demodulating circuits which will now be described in detail. The several components up to and including the clipper or grass-cutter 13 may be of known design for developing a series of negative voltage peaks, as shown by waveform curve adjacent the output side of the grass-cutter 13 in FIG. 3. The voltage peaks 1, 2 and 3 have the same spacing, in time, as the radar pulses 1, 2 and 3 of a pulse group G, and the function of the shaper 14 is to develop a sequence of square pulses having the same time relationship.

In FIG. 4, the grass-cutter is shown as a triode 30 having a grounded cathode and a grid upon which a wave form comprising noise and signal peaks 1, 2 and 3 is impressed from the video amplifier 12 through a coupling condenser 31. The grid is adjustably biased negatively through a fixed resistor 32 and potentiometer 33 connected to a bus or line 34 maintained at a negative potential which, as indicated by the legend, may be —60 volts. The bias is no adjusted below cut-off that the tube 30 suppresses noise and clutter components, and the tube 30 output consists of three negative voltage peaks 1, 2 and 3 which are developed across output resistor 35.

The shaper is a novel one-shot multivibrator comprising triodes 36A, 36B which may be, as shown schematically, enclosed in a single envelope, and which has approximately a 2 microsecond duration and with constants such that it is able to repeat rapidly. The input to triode 36A is through a condenser 37 connected between its grid and the plate of the grass-cutter, and triode 36A is normally conductive in view of a positive voltage imposed on the grid through resistor 38, of the order of 400,000 ohms, which is connected to a point of high positive voltage, for example to the +340 volt source. The plate of triode 36A is connected to the grid of triode 36B through a resistor 40 and relatively large isolating condenser 41, and the grid of triode 36B is normally biased negatively to cut-off by resistor 42 which connects the grid to the junction of voltage-divider resistors 43, 44 in series between the negative potential bus 34 and ground.

As distinguished from conventional multivibrators, the circuit elements which determine the duration of the stroke are not directly in the feedback paths from plates to opposite grids. In this circuit the duration-determining constants are the input coupling condenser 37 and the resistor 38; in conventional multivibrators of this type, the duration-determining constants would be connected directly from one plate to the opposite grid, and the input trigger signal connected to grid, or plate, in parallel thereto.

Whereas, in conventional multivibrators, the feedback arising from the operation of the circuit is applied directly to a grid, which, in turn may in some instances be also the grid to which the input trigger is applied by way of some coupling impedance, in this circuit the feedback is applied directly to the trigger source itself and is utilized to maintain the voltage output of the trigger source at a suitable value, regardless of what value it would have had in the absence of this feedback.

In this way the elements which determine the duration of the multivibrator stroke (namely the condenser 37 and the resistor 38) are enabled to operate under constant conditions, and thereby to maintain the multivibrator stroke itself constant.

It is apparent from the above, of course, that the multivibrator must be a "stiff" source for feedback relative to the grass-cutter plate circuit as a load; this condition is readily achieved, for the impedance of the plate circuit of tube 36B during the stroke is very low due to the positive voltage on its grid during this period.

The sequence of operations in the circuit is as follows: A negative voltage pulse imposed on the grid of tube 36A by way of condenser 37 from the grass-cutter 30 causes a decrease in the plate current of tube 36A. The resulting rise in plate voltage is carried, by way of resistor 40 and large condenser 41, to the grid of tube 36B where it causes plate current to flow. The resulting drop in plate voltage of tube 36B is fed back to the grass-cutter plate circuit by way of large condenser 45, and thereby amplifies the original trigger by regeneration at this point. Tube 36A is thus carried far below cut-off, and tube 36B is caused to conduct very heavily. At this instant, and for the duration of the cycle, the high side of the input circuit, i.e. the plate of tube 30, is depressed in voltage by the same amount as the fall in voltage of the plate of tube 36B, for condenser 45 is so large (for instance, 1000 micromicrofarads) that the voltage across it does not change materially during the short duration of the multivibrator stroke.

One side of condenser 37 is thus held at a definite voltage, far negative with respect to its quiescent value; the other side is connected to a large positive voltage through resistor 38. Condenser 37 is relatively small (for instance 20 micromicrofarads) and therefore charges rapidly toward the supply voltage (340 volts, for instance, as shown on FIG. 4). As soon as the voltage on the grid side of condenser 37 rises above the cut-off voltage of tube 36A this tube begins to draw current again, feedbacks of the opposite sense arise, as is well known in the art, and the cycle ends abruptly. The feedback through the large condenser 45 thus acts to stabilize the length of the cycle, independent of the wave shape, amplitude and duration of the triggering pulses at the grass-cutter tube 30, by maintaining the voltage on the grass-cutter side of condenser 37 at a constant value. The input circuit condenser 37 is thereby permitted to charge under uniform conditions, regardless of the form of the trigger signal, until triode 36A is once more conductive and ends the cycle.

The typical qualitative voltage curves of FIGS. 4A to 4D illustrate the manner in which the described shaper circuit operates to develop output pulses which are essentially independent of the amplitude and duration of the incoming triggers. In FIG. 4A, the curves $30g$ and $30'g$ show the form of positive voltage pulses imposed upon the grid of the grass-cutter tube 30 by relatively weak and relatively strong signals, respectively; except for the feedback path above noted the plate voltage waves would differ from each other in similar fashion. However, in the actual circuit the resultant voltage waves $30p$ and $30'p$ at the plate of tube 30 are as shown in FIG. 4B. It is to be noted that the drop in plate voltage for an arriving weak signal includes an initial section, indicated by the legend "Input Signal," and a supplemental and further voltage drop due to feedback through condenser 45 and identified by legend "Feedback." The resultant variations in grid potential at tube 36A are shown in FIG. 4C by curves $36g$ and $36'g$ for weak and strong signals, respectively. The inputs to the grid of shaper tube 36A being thus substantially constant for both weak and strong signals, the significant output voltage pulses from the shaper are thus of a shape and timing substantially independent of the amplitude and duration of the arriving signal pulses.

It is to be noted that a very strong input trigger which has been lengthened by overloads to a duration longer than the desired shaper stroke (right hand side of FIG. 4A) produces a corresponding lengthened disturbance in the grass-cutter plate (right hand side of FIG. 4B) but that no corresponding lengthening is caused in the shaper grid circuit (right hand side of FIG. 4C) or in the shaper plate-voltage waves, $36p$ or $36'p$ (FIG. 4D) which have the same duration as this grid wave. Conversely, a weak and short input trigger which, in the absence of feedback, would tend with its trailing edge to give a positive impulse to the grid of tube 36A (as indicated by dotted line in FIG. 4B) and thus end the stroke prematurely, is prevented from so doing by feedback applied in accordance with this invention, (see the left hand side of FIG. 4B).

The sequence of positive square pulses corresponding to the incoming triggers is transmitted along path A from the plate of the shaper triode 36A to the single-shot multivibrator, comprising triodes 46A, 46B which is the "wiper" component 15 of the radar beacon. The path A connection includes a blocking condenser 47 between the shaper tube plate and the grid of triode 46A, which triode is normally conductive as its grid is connected to its cathode through a resistor 48. The grid of triode 46B is connected to ground through a resistor 49 and is normally biased negatively to cut-off by potential drop across a common cathode resistor 50. The plate of triode 46A is connected to the grid of triode 46B by a condenser 51 of about 1000 micromicrofarads, while the plate of triode 46B is connected to the grid of triode 46A through a condenser 52 having a value of about 50 micromicrofarads when the resistor 48 has a value of about 470,000 ohms. The plates are energized through a common resistor 53 and individual resistors 53A, 53B, respectively.

Condenser 47 is charged by grid current in tube 46A during the first stroke of the shaper. The wiper multivibrator is thus triggered by the negative trailing edge of pulse 1, and the constants are such that the firing of triode 46B blocks triode 46A for a period substantially longer than the duration of a pulse group G.

The potential drop at the plate of triode 46B is applied along path A' (comprising lead 54, blocking condenser 55 and resistor 56) see FIGS. 4 and 5, to the input grid of triode 57A known as the "line amplifier" 16, thereby carrying the input grid so far negative that the tube 57A will pass only pulse 1 of a group G reaching the tube along path B (comprising condenser 58 and resistor 59) from the plate of shaper triode 36A. A grid bias resistor 60 is connected between the condenser end of resistor 59 and voltage-divider resistors 61, 62; the latter being connected between ground and the negative potential bus 34.

Triode 57A is normally biased just below cut-off and has in its plate circuit a delay line 63 which is terminated at its input end by its characteristic resistance 64, the delay line or "decoding box" including taps and a switch 63a to short-circuit the delay line at any one of six positions according to the selected code or time interval $t_1$ between pulses 1 and 2 of group G. The combined action of voltages imposed on the grid of triode 58A along paths A and B is to develop a negative square pulse 1 across the plate resistor 64, but the pulses 2 and 3 are unable to drive the triode 57A conductive again, due to the action of wiper 15; hence the signal applied to the delay line 63 consists of only a negative signal pulse 1. After a time interval determined by the effective length of the line in use, the echo of this negative pulse is reflected by the short-circuit on the line and appears at the input inverted and therefore as a positive pulse E. This positive pulse E, and also the initial negative pulse 1, are applied through a coupling condenser 65 to the grid of the echo-amplifier triode 57B but since tube 57B is also biased below cut-off only the positive input pulse E produces an output signal. This amplified echo is imposed upon the cathode of a diode 65A and, through a resistor 66, on the cathode of diode 65B, the diodes constituting the echo gate 18 indicated in the block diagram, FIG. 3. A resistor 67 is connected between the cathode of diode 65A and ground, an intermediate point of the resistor being connected to the plate of diode 65A, and the diode plate is by-passed to ground through a relatively large condenser 68 of the order of 0.05 microfarad. A resistor 69 of the order of 100,000 ohms connects the plates of diodes 65A and 65B, and the plate of diode 65B is connected to the pedestal 19 through a coupling condenser 70. The plate of triode 36A of the shaper assembly 14 is connected to the cathode of diode 65B by path C which includes a condenser 71; and negative voltage pulses 1, 2 and 3 as developed by triode 36A are therefore imposed upon the diode 65B.

The output from diode 65B is developed only by pulse 2, if and when the arrival of pulse 2 at the cathode of diode 65B coincides with the arrival of an amplified echo pulse E at the cathodes of diodes 65A and 65B. The normal direct current voltage $E_0$ across the cathodes and plates of diodes 65A and 65B is reduced substantially to zero by the amplified echo voltage, i.e. the cathode voltage drops substantially to the plate voltage but cannot fall further, due to the high conductivity of diode 65A and to the fact that the plate of this diode is held at a substantially constant potential by the large condenser 68. The echo pulse E thus brings the cathodes of diodes 65A and 65B to the potential of their plates for the duration of the echo pulse, and thus puts diode section 65B in a condition ready to conduct. If, therefore, a negative signal pulse 2 arrives at the cathode of diode 65B, along path C from the shaper 14, during the echo interval, it can pass through the diode 65B to develop a negative pulse 2 which is imposed through coupling condenser 70 upon the control grid of triode 72 of the "pedestal" single-shot multivibrator.

The function of the pedestal 19 is to develop a relatively long pulse originating at time 2, having the wave form 19a as shown in FIGS. 3 and 5, when and only when pulses 1 and 2 of a group G are properly spaced by the selected code time interval $t_1$. The pedestal output pulse 2 is of relatively long duration, for example of the order of 20 microseconds if the mean time interval $t_2$ between pulses 2 and 3 has been chosen as about 12 microseconds. The operation of the further components of the apparatus depends upon the activation of the pedestal, i.e. the establishment of the 20 microseconds' voltage pulse 2 by the timely arrival of pulses 1 and 2 at the selected code interval $t_1$.

It is, of course, possible to cause the pedestal to fire upon the arrival of the first pulse instead of the second. In the particular example described this was accomplished (for two-pulse operation of the system) by removing the plate voltage from echo amplifier tube 57B, thus removing the direct current voltage from resistor 67 and thereby removing the initial bias from diode 65B.

Triode 72 of the pedestal is normally conductive as its control grid is connected to a source "±340 v." of positive potential through a resistor 73 of high value, for example about one megohm, and the second triode 74 of the pedestal multivibrator therefore is normally non-conducting. The cathodes of triodes 72, 74 are connected to each other and to ground through a common cathode resistor 75, and the control grid of triode 74 is connected to ground through a resistor 76. The plate of triode 72 is connected to the control grid of triode 74 through a condenser 77 and resistor 78 in series, and their junction is connected to ground through a condenser 79 which serves to retard the rise of plate voltage in triode 72. The plate of triode 74 is connected to the control grid of triode 72 through a condenser 80, and the plates of both triodes are energized from a source of positive potential through individual plate resistors R.

The arrival of a negative trigger pulse 2 at triode 72 from the echo gate diode 65B blocks conduction through that triode and thereby fires triode 74 which, in turn, imposes a negative pulse on the control grid of triode 72 through coupling condenser 80. Conductivity through triode 72 is restored when the negative voltages imposed on its control grid are neutralized by a positive voltage developed by the positive source "+340 v." through the high value resistor 73, and the circuit constants are such that the pedestal voltage pulse 2 has a duration of about 20 microseconds. The pedestal voltage pulse 2 developed at the plate of triode 72 is imposed upon the impedance-transforming modulator-driver 23 through a coupling condenser 81 and lead 82, and is also imposed upon the integrator 20 and discriminator 21 through a coupling condenser 83 and lead 84, as indicated by the legends of FIG. 5 and as shown in FIG. 6, the circuit diagram of the detector or demodulator system.

The modulator driver is a conventional cathode-follower comprising a triode 85 having a cathode resistor 86 and grid-return resistor 87 connected to the negative potential bus 34, for the purpose of maintaining the grid of first modulator 89 at a suitable negative bias. The positive voltage pulse developed across the cathode resistor 86 by a positive signal pulse 2 is passed through a resistor 88 to the control grid of the first modulator tube 89 but is not, of itself, sufficient to fire tube 89 which may be, for example, a Type 2D21 Thyratron with its screen electrode biased negatively through a resistor 90 connected to the junction of voltage-divider resistors 91, 92 which are serially connected between the negative bus 34 and ground. The cathode is returned to ground through circuit elements, not shown, forming part of the transmitter control system. The screen grid of tube 89 is connected to the plate of shaper triode 36A by path D, which includes an isolating condenser 93. The sequence of positive pulses 1, 2 and 3 thus applied to the screen grid of tube 89 is also unable, per se, to fire the tube 89 but, if a positive pedestal voltage pulse 2 has been established on the control grid of tube 89, then the tube will fire upon the arrival of pulse 3 at its screen grid along path D.

The steep negative wave-front generated in the plate circuit of the first modulator tube by the firing of this tube is differentiated by condenser 94 and resistor 96, and the resulting sharp negative trigger passed through the "negative gate" diode 97 and lead 98 to the detector driver tube 99. The function of the negative gate is to prevent later positive triggers from reaching the detector driver and associated circuits.

It is to be noted that this particular method of deriving an input signal for the detector driver was adopted in the circuits of the present illustrative example for reasons of economy of circuit elements in view of the fact that the first modulator was a necessary part of the beacon transmitter circuits, and is not an essential feature of the invention. Any other means of deriving a constant amplitude negative trigger at time 3, by methods known to the art, would be acceptable.

A steep negative wave-front 3 for energizing the detector system is thus developed at the plate of the first modulator tube 89 only upon the timely arrival of pulse 3 at the screen of tube 89, along path D from the shaper, after the development by the pedestal multivibrator tubes 72, 74 of a positive pedestal beginning at time 2 as the result of the coincident arrival of echo pulse E and control pulse 2 at the echo gate. The pedestal pulse 2 conditions the first modulator tube 89 to fire upon the arrival of a subsequent pulse, normally the pulse 3, at its screen electrode. It is possible that pulse 2 may have the wrong spacing $t_1$ to pass the echo gate, and yet for the total time between pulses 1 and 3 to equal the selected code interval $t_1$ between pulses 1 and 2. In this case, the pulse 3 will fire the pedestal and thereby condition the first modulator for operation, but it requires an additional or fourth pulse to fire the first modulator. Therefore, under this abnormal condition of an establishment of the pedestal by a wrong coding, the detector system is not energized as the pulse group G contains only three pulses and the additional pulse required for firing of the first modulator is missing.

The steep wave-front at the plate of tube 89 is differentiated by condenser 94 and resistor 92, is passed through diode 97 and drives the grid of detector driver 99 below cut-off and results therefore in a positive square wave 3 at the plate which is taken off through two paths to the control grids of the balanced detector tubes 100 and 101. The first path leads directly to the control grid of tube 100 through a blocking condenser 102 and resistor 103, the tube 100 being a cathode follower biased beyond cut-off and with a pulse-stretching circuit, comprising resistor 104 and condenser 105, in its cathode. A short positive pulse at its grid therefore results in the formation of an exponential decay curve of long duration at its cathode and, in the described typical embodiment of the invention, the time constant of the pulse-stretching circuit was approximately 220 microseconds.

The second path from the plate of the detector driver 99 is to the control grid of tube 101 of the balanced detector through the limiting resistor 106, and by way of a clipping discriminator diode 107. The cathode of diode 107 is normally biased at a potential somewhat above the plate by reason of its connection through resistors 108, 109 to a point part way down the plate load resistors 110, 111 of the detector driver 99. Resistor 108 of this biasing circuit is connected to the cathode of discriminator diode 107 through resistor 112 of the integrating circuit which includes, in addition to resistor 112, a condenser 113 connected between the diode cathode and ground. The values of resistor 112 and condenser 113 may be about 180,000 ohms and 470 micromicrofarads respectively, and the pedestal pulse 2 which is imposed upon the resistor 112 through lead 84 therefore delivers a linear sawtooth voltage to the cathode of the discriminator diode. At the time of arrival of the trigger pulse 3 at the integrator resistor 112, without modulation and with the control interval $t_2$ between pulses 2 and 3 at its normal mean value, the sawtooth voltage at the discriminator cathode will have risen to about half amplitude. The cathode resistor 114 of tube 101 is connected to a source of positive potential "+150 v." through a potentiometer or adjustable voltage-divider 115, and the initial bias of tube 101 is so adjusted that the negative exponential wave on its plate, resulting from the arrival of this average positive pulse 3' at its grid, is just equal and opposite to the exponential wave at the cathode of tube 100. The plate resistor 116 and shunt condenser 117 of tube 101 have the same values as cathode resistor 104 and shunt condenser 105 respectively of tube 100 in order that both tubes may have the same pulse-stretching characteristic. The exponential waves add algebraically in the mixing resistors 118, 119 which are serially connected between te cathode of tube 100 and the plate of tube 101, and the lead 120 to the amplifier and selector circuits is connected to the midpoint of the resistors 118, 119.

With the bias of tube 101 adjusted for equality of the tube outputs at the average value of 12.2 microseconds for the control interval $t_2$, there will be zero voltage at the detector output lead 120 so long as the received pulse groups G are not modulated. As viewed on the screen of an oscilloscope, the output wave appears as a substantially straight line, FIG. 7A, when the detector is balanced and the incoming signals are not modulated. The small residual voltage pips are spaced by time intervals T of 1370 microseconds in the case of the particular apparatus for which appropriate values are specified in the above description. If, however, the control interval is decreased below its mean value, the signal 3' at the grid of tube 101 will be clipped at a lower-than-normal amplitude and the resulting exponential wave at its plate will be smaller than normal. The sum of this decreased amplitude negative wave and the fixed amplitude positive wave from tube 101 will be a positive exponential wave $b$ as shown in FIG. 7B. Correspondingly, if the control interval $t_2$ exceeds its mean value of 12.2 microseconds, the negative exponential wave at the plate of tube 101 will be larger, and the sum of the exponential wave components at the detector output lead 120 will be a negative exponential wave $c$, as shown schematically in FIG. 7C. When the control interval $t_1$ is modulated at a frequency $f_m$, the output varies cyclically between the positive and negative values represented by curves $b$ and $c$, and the wave form $d$ as seen on an oscilloscope synchronized with the pulse repetition frequency, see FIG. 7D, appears as a series of exponential waves, some positive, some negative and some zero, corresponding to different values of the control interval during modulation. When the oscilloscope is synchronized with the modulating frequency, see FIG. 7E, the wave e has the form of a number of sawteeth developed in successive pulse repetition periods T during a modulation period $T_m$, and the envelope of the peaks of the sawtooth waves is a duplicate of the original modulating wave at the radar transmitter. It is to be noted that if the voltage wave of FIG. 7E is passed through a low-pass filter having a cutoff higher than the frequency of the envelope of the wave, but less than one-half the pulse-repetition frequency, the output of the filter will be a nearly pure sine wave, with negligible components at other than the envelope frequency (or frequencies, if the modulation contains more than one low-frequency component). Moreover, the amplitude of the output wave will be linearly related to the amplitude of the original modulating wave.

The balanced detector operates in the described manner when a trigger pulse 3 is developed at the detector driver 99 during the period within which the potential of the cathode of the discriminator 107 is rising as the result of a pedestal pulse 2 imposed upon the integrator network 112, 113. Attention is directed to the fact that the balanced detector will not inadvertently develop a false output when one pulse of a group is intermittently missing. In the event that either pulse 1 or pulse 2 is strongly attenuated or missing, the decoding circuits will not deliver a pulse 2 to the pedestal, the pedestal will not fire, and therefore the first modulator is unable to develop a trigger pulse 3, i.e. if pulse 2 does not reach the detector, pulse 3 is also missing. If pulse 2 does reach the detector, the absence of a trigger pulse 3 will not result in a faulty response since pulse 2 does not of itself develop a signal on the balanced detector grids. This feature is of the utmost importance in systems in which signals at and near threshold level may be received; without it, threshold signals would cause the generation of many spurious transient output frequencies which would erroneously close the selective control relays.

When the detector output circuit has a cut-off frequency less than one-half the pulse repetition frequency PRF, which was 732 cycles per second in the specifically described embodiment, a low-pass filter in the output line will select a demodulated signal frequency $f_r$ equal to the modulation frequency $f_m$. Voltage components of other frequencies are developed in the pulse-position modulation detector circuits and may be usefully employed by an appropriate design of the filter circuits following the detector. With a pulse repetition frequency F and a modulation frequency $f_m$, it is possible to demodulate the pulse group G to develop a signal or receiver frequency $f_r$ equal to, according to the type of filter circuit employed:

$$f_r = f_m \quad (1)$$
$$f_r = nF - f_m \quad (2)$$
$$f_r = nF + f_m \quad (3)$$
$$f_r = f_m - nF \quad (4)$$
$$f_r = f_m + nF \quad (5)$$

or, expressed more generally, $$f_r = |\pm p f_m \pm nF| \quad (6)$$

wherein $n = 0, 1, 2, 3 \ldots$
$p = 0, 1, 2, 3 \ldots$

In order to obtain a demodulated signal $f_r$ at an amplitude which is substantially proportional to the amplitude of the original modulation wave M it is important that the time constants of cathode resistor 104—shunt condenser 105 of tube 100 and of plate resistor 116—shunt condenser 117 of tube 101 be equal and relatively short (i.e. less than about ¼ of the pulse repetition period T, where $$T = \frac{1}{F} \quad (7)$$

The frequency-shift characteristic of this type of pulse-position modulation and demodulation may be visualized as a stroboscopic effect rather than a beat effect such as would be developed in the case of continuous waves. The transmitted pulses are present during only a very small portion of the pulse repetition cycle and, if the pulse-position modulation $f_m$ is occurring at a very low frequency, say one cycle per second, the actual effect on the pulse positions in successive groups G is exactly the same as it would be if the modulation were being applied at $(F \pm 1)$ cycles per second. That is, the beacon receiver "looks" stroboscopically at the modulation wave once in each pulse repetition period T, and thereby determines the instantaneous value of the modulating wave by measuring the departure of pulse spacing from normal. A succession of such stroboscopic views finally builds up the output signal voltage. If $f_m$ is one cycle per second, successive views progress directly along the modulation wave M and, if $f_m = F + 1$ cycles per second, the successive views are of a new cycle of voltage $f_m$ each time but the progression along the modulation wave shape takes place in exactly the same manner as with the modulation frequency $f_m$ of one cycle per second.

The tuned relay circuits which are selectively energized by received signals of different modulation frequencies may be of any known or desired construction and form no part of the present invention.

It is to be understood that the invention is not limited to the circuits and circuit elements herein shown and described since various changes may be made without departing from the spirit and scope of the invention as set forth in the following claims.

I claim:

1. In a pulse-group signalling system utilizing pulse groups widely spaced in time, each pulse group comprising a plurality of identical pulses spaced relatively close in time; a receiver comprising means including a shaper circuit for developing a sequence of square wave pulses from and corresponding in timing to the several individual pulses of a received pulse group, and a decoding circuit energized by said shaper circuit for developing a decoded pulse when the time interval between the first pair of square wave pulses of a group is equal to a preselected code interval; said decoding circuit comprising means energized by said shaper circuit and including a delay line for developing an echo pulse at a predetermined time interval following the first square wave pulse of said pair, wiper means rendering said decoding circuit inoperative to develop echo pulses from those square wave pulses of any group subsequent to the first pulse thereof and means responsive to a conicidence of said echo pulse and the second pulse of said pair for developing the decoded pulse.

2. In a pulse-group signalling system, the invention as recited in claim 1, in combination with means responsive to a decoded pulse for developing a pedestal pulse of time duration terminating prior to the arrival of a subsequent pulse group, and electronic means energized by a pedestal pulse to develop a control pulse from a square wave pulse of said sequence following said pair of square wave pulses by a time interval less than the duration of said pedestal pulse.

3. In a pulse-group signalling system, the invention as recited in claim 2, wherein said electronic means includes a radio transmitter for emitting a pulse reply.

4. In a pulse-group signalling system, the invention as recited in claim 2, wherein said electronic means includes a detector circuit developing an output voltage significant of the time interval between the second pulse of said pair and said following pulse.

5. In a pulse-group signalling system, the invention as recited in claim 1, wherein the first said means of the decoding circuits includes a line amplifier tube having said delay line in its output circuit, and an input circuit connection from said shaper circuit to said line amplifier for impressing said sequence of square wave pulses upon said line amplifier tube; and said wiper means comprises a wiper tube energized by said sequence of pulses for blocking transmission by said line amplifier tube of all pulses following the first pulse of said preselected pair of square wave pulses.

6. In a pulse-group signalling system, the invention as recited in claim 5, wherein the last-mentioned means of said decoding circuit comprises electronic echo gate means upon which is impressed said echo pulse and said sequence of pulses developed by said shaper circuit, said echo gate means being biased to be non-responsive to said echo pulse and to the pulses of said sequence, and to develop a decoded pulse in the event of a coincidence of said echo pulse and a pulse of said sequence.

7. In a pulse-group signalling system utilizing successive pulse groups widely spaced in time, each pulse group including a plurality of pulses spaced relatively close in time and with a modulation pulse of the group spaced from a following trigger pulse by a time interval varying from a normal value according to a preselected modulation frequency; a receiver for developing an output voltage significant of the modulation frequency; said receiver including a pair of detector tubes, detector driver means responsive to a trigger pulse for impressing driving pulses simultaneously upon said tubes, output circuits for said tubes connected to develop an output voltage equal to the algebraic sum of the output voltages of the respective tubes, and discriminator means energized by a modulation pulse for varying the amplitude of the output voltage developed by one of said tubes in accordance with variations from normal of the time interval between said modulation pulse and the following trigger pulse, the output voltage of the other tube being constant.

8. In a pulse-group signalling system, the invention as recited in claim 7, wherein said discriminator means includes clipping means for varying the amplitude of the driving pulse applied to that tube which develops the output voltage of varying amplitude.

9. In a pulse-group signalling system, the invention as recited in claim 8, wherein said clipping means includes a tube for passing a driving pulse from said detector driver means to that detector tube which develops the output voltage of varying amplitude, and means initiated in operation by a modulation pulse for progressively varying the bias on said last-mentioned tube.

10. In a pulse-group signalling system, the invention as recited in claim 7, in combination with decoding means for developing trigger pulses for application to said detector driver means only when the modulation pulse is spaced from a preceding pulse by a preselected code interval.

11. In a pulse-group signalling system utilizing successive pulse groups in which a pair of pulses are separated by a time interval varying about a preselected normal value according to an imposed modulation; a receiver for developing an output voltage significant of the imposed modulation, said receiver including a pair of detector tubes and associated circuits balanced to develop zero output current from received pulse groups in which the pulses of said pair are separated in time by said normal value, means for varying the net output of said detector tubes in accordance with the instantaneous time interval between the pulses of said pair, and means preventing the development of a finite net output by said detector tubes in the event that either pulse of said pair is missing from a received pulse group.

12. In a pulse-group signalling system utilizing successive pulse groups in which a pair of pulses are separated by a time interval varying about a preselected normal value according to an imposed modulation; a receiver for developing an output voltage significant of the imposed modulation, said receiver including a pair of detector tubes and associated circuits balanced to develop zero output current from received pulse groups in which the pulses of said pair are separated in time by said normal value, driver means energized by the arrival of the second pulse of said pair for developing a driving voltage pulse and transmitting the same simultaneously to said tubes, and clipping means energized by the first pulse of said pair for varying the amplitude of the driving voltage pulse transmitted to one of said tubes in accordance with the instantaneous value of the time interval between the pulses of said pair.

13. In a pulse-group signalling system, the invention as recited in claim 12, in combination with pedestal means energized by the first pulse of said pair to condition said driver means to develop said driving voltage pulses from the second pulse of said pair, whereby a false output from said detector tubes is not deevloped when the first pulse of said pair is missing from a received pulse group.

14. In a pulse-group signalling system, the invention as recited in claim 13, wherein each pulse group includes a coding pulse preceding said pair of pulses by a preselected code time interval, in combination with means blocking energization of said pedestal means when the time spacing of the coding pulse from said pair of pulses differs from the preselected code time interval.

15. In a pulse-group signalling system, the invention as recited in claim 12, wherein said circuits associated with said detector tubes include substantially identical pulse-stretching circuits having time constants which are equal and small with respect to the repetition period of said pulse groups.

16. In a pulse-group signalling system utilizing successive pulse groups in which the first and second pulses are separated in time by a preselected code interval, and the second and third pulses are separated by a time interval variable according to an imposed modulation frequency; a demodulating receiver including a pair of detector tubes and associated circuits balanced to develop zero output current from received pulse groups in which the second and third pulses are spaced by the mean time interval, means for developing and imposing upon said tubes a voltage pulse corresponding to the third pulse of a group, and means energized by the second pulse for clipping the voltage output of one of said tubes in accordance with the instantaneous value of the time interval between said second and third pulses.

References Cited in the file of this patent

UNITED STATES PATENTS

| | | |
|---|---|---|
| 2,266,401 | Reeves | Dec. 16, 1941 |
| 2,391,776 | Fredendall | Dec. 25, 1945 |
| 2,405,237 | Ruhlig | Aug. 6, 1946 |
| 2,405,843 | Moe | Aug. 13, 1946 |
| 2,413,023 | Young | Dec. 24, 1946 |
| 2,415,359 | Loughlin | Feb. 4, 1947 |
| 2,443,198 | Sallach | June 15, 1948 |
| 2,444,426 | Busignies | July 6, 1948 |
| 2,445,448 | Miller | July 20, 1948 |
| 2,451,859 | Mumma et al. | Oct. 19, 1948 |
| 2,458,030 | Rea | Jan. 4, 1949 |
| 2,462,100 | Hollabaugh | Feb. 22, 1949 |
| 2,462,110 | Levy | Feb. 22, 1949 |